Aug. 9, 1938.   A. NAGEL   2,126,340
SHUTTER ACTUATING MECHANISM
Filed Feb. 20, 1937    2 Sheets-Sheet 1

August Nagel,
INVENTOR
BY
ATTORNEYS.

Aug. 9, 1938.  A. NAGEL  2,126,340

SHUTTER ACTUATING MECHANISM

Filed Feb. 20, 1937  2 Sheets-Sheet 2

August Nagel, INVENTOR

BY

ATTORNEYS.

Patented Aug. 9, 1938

2,126,340

UNITED STATES PATENT OFFICE 2,126,340

SHUTTER ACTUATING MECHANISM

August Nagel, Stuttgart, Germany, assignor to Eastman Kodak Company, Rochester, N. Y., a corporation of New Jersey Application February 20, 1937, Serial No. 126,896
In Germany October 1, 1936

12 Claims. (Cl. 95—53)

This invention relates to photography, and more particularly to a folding camera wherein the shutter which is of the setting type is set and released by means of a common actuating member which is mounted on a camera body.

One object of my invention is to provide a folding camera which is equipped with a shutter of the setting type with an actuating mechanism by means of which the shutter can be set and released in proper sequence by means of a single actuating member.

Another object is to provide a shutter actuating mechanism of the type referred to wherein the actuating member therefore is mounted on the camera body.

And still another object is to provide a shutter actuating mechanism of the type referred to which is so constructed that no disconnection of its several parts is required when the camera is collapsed.

Briefly, my invention comprises a rod which is so mounted in the camera body parallel to the axle of the camera bed as to be longitudinally displaceable therein. This rod is adapted to operate two driver members which cooperate positively with a pair of motion transmitting means, one of which actuates a driver ring on the shutter for cocking or setting the same, while the other actuates the shutter trigger after the shutter has been set.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with thhe accompanying drawings in which, Fig. 1 is a plan view of a folding camera with certain parts thereof removed, and showing my novel shutter actuating mechanism in its inoperative position.

Like reference characters refer to corresponding parts throughout the drawings.

Figure 1:
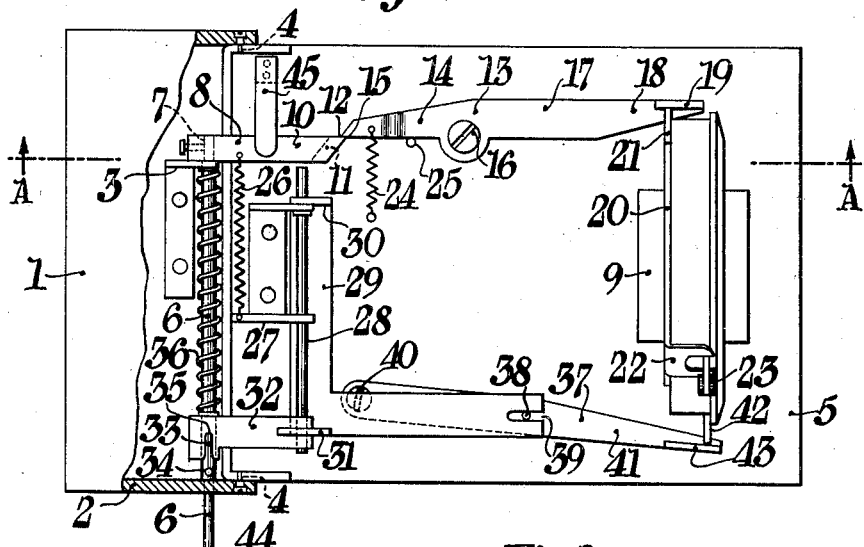
Figure 2:
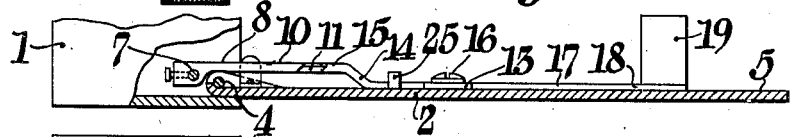
Fig. 2 is a longitudinal section taken on line A—A of Fig. 1, the shutter being omitted for the sake of clarity.

Referring now to the drawings, rod 6 is slidably mounted in the camera body 1 and is carried in the side wall 2 and the bearing 3 parallel to the bearings 4 of the camera bed 5. Rod 6 carries a finger 8 fixed at its inner end 7, and finger 8 has an oblique part 11 at its end 10 which faces the shutter 9. The oblique part 11 is formed by bevelling the end of the finger 8 in both plan view and side elevation, as clearly indicated in the drawings, so that it can slide over the end 15 of the arm 14 in one direction for the purpose hereinafter described. The shutter 9 can be foldably mounted on the camera bed 5 and be connected to the camera body 1 by means of a bellows in any customary manner, not shown, so that it will collapse to allow the bed 5 to fold into the camera body to close the same when the camera is not being used. A lever 13 is rotatably pivoted to the bed 5 by screw 16, and the end 15 of an arm 14 of the lever bears against the longitudinal edge 12 of the finger 8. The other arm 17 of the lever 13 has, on its front end 18, an extension 19 which is bent off vertically to the camera bed 5. Bearing against this extension is an arm 21 and a ring 20 which is rotatably mounted about the casing of the shutter 9, and this ring possesses a forked projection 22 which embraces the lever 23 serving to set the shutter. A helical spring 24, one end of which is fastened to the arm 14 and has its other end arranged in any suitable manner on the camera bed, tends to normally hold the lever 14 against the stop pin 25 which is fixed to the camera bed 5.

A helical spring 26 is fastened at one end to the finger 8 and at the other end to the bearing 27 so that it normally pulls the finger 8 toward the bearing 3 which serves as a stop therefor.

The bearing 27 carries the pin 28 which is directed parallel to the bearings 4 of the bed 5 and parallel to the rod 6. This pin 28 serves as a longitudinal securing means for the slide 29. Slide 29 has extensions 30 and 31 which are directed vertically upward. An extension 32 slidably mounted on the rod 6 grasps the extension 31 in a fork-like manner, and has a longitudinal slot 33 in which a cross pin 34 on rod 6 engages and has its abutment at the end 35 of slot 33. Between the extension 32 and the bearing 3 there is located a helical spring 36 by means of which a slide 29 is pressed with its extension 30 against the bearing 27.

Cooperating with slide 29 by means of a pin 38 and a slot 39 is a lever 37 which is rotatably mounted to the bed 5 by screw 40. The other end 41 of the lever 37 has a vertical projection 43 which faces and is in the path of the shutter trigger 42 when the camera is moved to its open position, as shown in Fig. 1.

Figure 3:
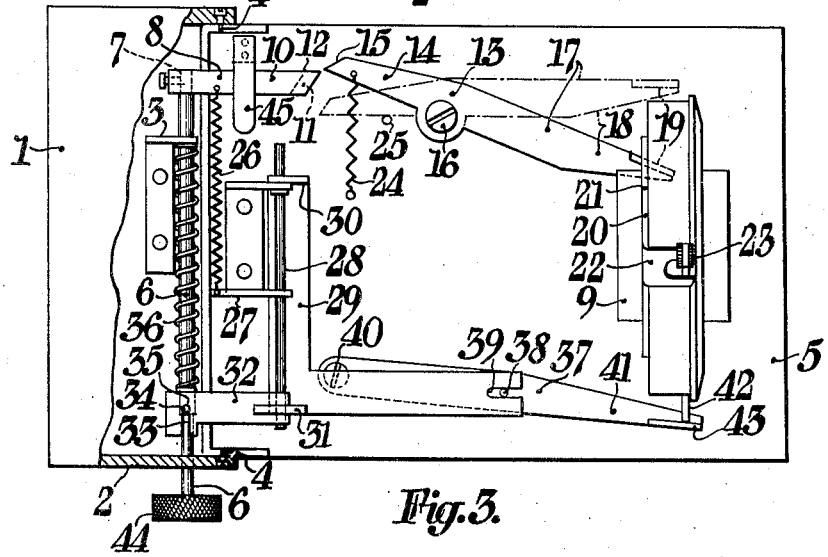
Fig. 3 is a plan view corresponding to Fig. 1 after a setting of the shutter has been effected.
Figure 4:
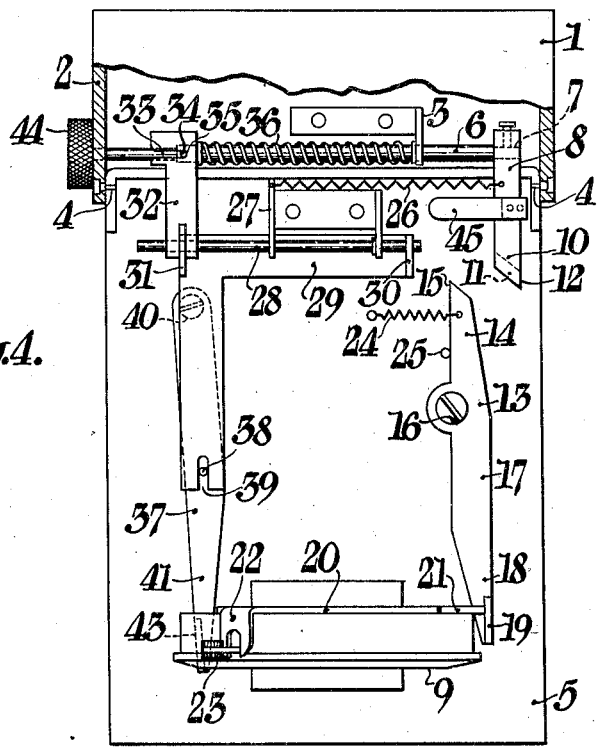
Fig. 4 is a plan view corresponding to Fig. 1 after the release of the shutter has been effected.
Figure 5:
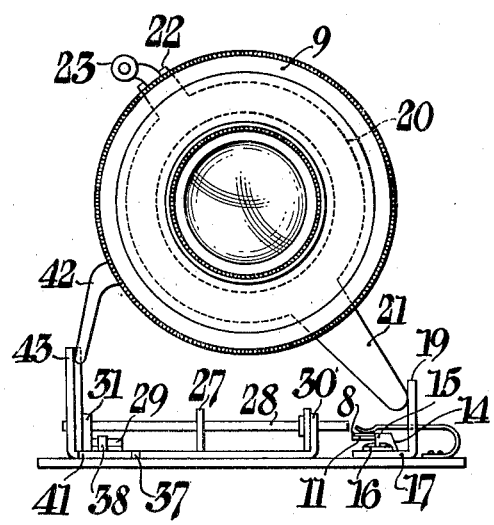
Fig. 5 is a partial front elevation corresponding to Fig. 1, with the camera body and all parts mounted therein being omitted for the purpose of clarity.

The method of operation of this device is as follows: When the user of the camera presses against the button 44 with his hand, the rod 6 is displaced transversely of the camera body 1 and finger 8 thereon is moved along with it. This finger presses, with its edge 12, against the end 15 of the lever 13, and rocks the latter about its pivot 16. The end 19 of the lever 13 presses against the arm 21 on the ring 20 and rotates it around the casing of the shutter 9. When this is being done, the yoke 22 takes the setting lever 23 with it, and thus sets the shutter, see Fig. 3. At the same time, the lever 13 is released from the part 8 and swings back into its original position, the rocking movement thereof being limited by the pin 25.

The pin 34 on the rod 6 then takes the part 32 with it on its further displacement, since this pin bears with pressure against the end 35 of the slot 33. The part 32, which embraces the projection 31 on the slide 29 in a fork-like manner, moves the slide 29 along the pin 28 and consequently causes the lever 37 to rock about its pivot 40. The end 43 of the lever 37 presses against the shutter trigger 42 to effect a tripping of the same.

After the exposure of the film has been effected in this way, the button 44 is released. The helical springs 36 and 26 compel the rod 6 and the parts 8 and 32 to return to their initial positions, see Fig. 1. When this is being done, the finger 8, slides by virtue of its oblique part 11, over the end 15 of the lever 13, and is then rocked by the leaf spring 45 toward the camera bed 5, so that it again occupies the driving position in respect to the lever 13.

From the above description it will be understood that my apparatus provides for the setting and releasing of a camera shutter through the manual operation of but a single actuating member, the actuation of both of said parts being effected by means of one directional movement of the actuating member which is mounted on the camera body of a folding camera remotely from the shutter. The present apparatus insures the cocking of a setting type shutter prior to the attempted release thereof, and thereby saves many an exposure which might be lost if a person attempted to release a setting type shutter before it was set. This novel shutter setting and releasing structure is simple and so inter-connected that it is automatically brought into operative position relative to the shutter when the camera is open for taking pictures.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention what I declare as new and desire to secure by Letters Patent is:

1. In a folding camera, the combination of a camera body, a bed hingedly carried by said camera body, a shutter of the setting type carried by said bed, an actuating member movably mounted on the camera body, and inter-connecting means movably mounted in said camera body and on said bed adapted to operably connect said actuating member and said shutter whereby the shutter can be set by said actuating member.

2. In a folding camera, the combination of a camera body, a bed hinged to said camera body and rotatably mounted thereon to swing between an open picture-taking position and a closed position, a shutter of the setting type carried by said bed, a setting lever on said shutter, of an actuating member movably mounted on said camera body, and inter-connecting means movably mounted in said camera body and on said bed adapted to operably connect said actuating member and the setting lever when said bed is rotated into picture-taking position.

3. In a folding camera, the combination of a camera body, a bed hingedly carried by said body, a shutter of the setting type carried by said bed, an actuating member movably mounted on the camera body, operable connections between the setting shutter and the actuating member including a lever carried by the bed for setting the camera shutter from the camera body.

4. In a folding camera, the combination of a camera body, a bed hingedly carried by said body, a shutter of the setting type carried by said bed, an actuating member movably mounted on the camera body, and including an axially movable rod, operable connections between said rod and the setting shutter including a lever pivoted to the bed for setting the shutter through axial movement of the rod.

5. In a folding camera, the combination with a camera body, a bed hinged to said camera body, a setting type shutter foldably mounted on said bed, a setting lever on said shutter, of an actuating member slidably mounted in said camera body, and a linkage operably connecting said actuating member with the setting lever when the shutter is brought to picture-taking position, said linkage including a finger affixed to said actuating member and slidable therewith, and a lever pivoted to the bed, one end of said lever adapted to extend into the path of said setting lever while the other end of said lever is adapted to extend into the path of said finger to be rotated thereby.

6. In a folding camera, the combination of a camera body, a bed carried by said body, a shutter of the setting type carried by said bed, an actuating member movably mounted on the camera body, a latch carried thereby, a lever movably carried by the bed and having one end extending into the path of movement of the latch, and the other end extending toward the shutter, said lever adapted to be engaged and moved by the latch by movement of the actuating member in one direction to set said shutter through the end extending theretoward, said latch slipping past the lever when the actuating member moves in a reverse direction.

7. In a folding camera, the combination with a camera body, a bed hinged to said camera body, a setting type shutter foldably mounted on said bed, a setting lever on said shutter, of an actuating member slidably mounted in said camera body, and a linkage operably connecting said actuating member with the setting lever when the shutter is brought into picture-taking position, said linkage including a lever pivoted to the camera bed, one end of said lever extending into the path of the setting lever, the other end of the lever extending toward the rear of the bed, means acting on said lever to normally force it to its inoperative position, a finger fixed to and slidable with said actuating member and adapted to extend forwardly over the bed to engage the end of the lever to rotate the same in one direction, the engaging end of said finger being oblique whereby it can pass over the end of the lever on its return stroke, and a spring normally forcing said finger toward the bed to engage the end of the lever.

8. In a folding camera, the combination with a camera body, a bed carried by said body, a setting type shutter carried by said bed, a setting lever carried by the shutter, a trigger release on the shutter, of an actuating member movably mounted on the camera body, and operable connections between the actuating member, the setting lever, and the trigger release on the shutter whereby an initial movement of the actuating member effects the setting of the shutter and further movement thereof effects the release of the shutter.

9. In a folding camera, the combination with a camera body, a bed carried by said camera body, a setting type shutter carried by said bed, a setting lever carried by the shutter, a trigger release on the shutter, of an actuating member movably mounted in the camera body, and interconnecting means movably mounted in said camera body and on said camera bed adapted to operably connect said actuating member with the setting lever and the trigger release on the shutter, a lost motion connection between the actuating member and one of said inter-connecting means whereby the shutter is set and released in proper sequence when the actuating member is moved.

10. In a folding camera, the combination with a camera body, a bed hinged to said camera body, a setting type shutter foldably mounted on said bed, a setting lever on said shutter, a trigger release on said shutter, of an actuating member slidably mounted in said camera body, and a linkage operably connecting said actuating member with the setting lever and the trigger when the shutter is brought to picture-taking position, said linkage including a lever pivoted to the camera bed to extend longitudinally thereof whereby one end of the lever is adapted to engage the setting lever while the other end of said lever extends toward the rear of the bed, a second lever pivoted on said bed and extending longitudinally thereof whereby one end thereof is adapted to engage the shutter trigger, and a pair of fingers fixed to and slidable with the actuating member, said fingers being adapted to engage and cause a rotation of the two levers about their pivots when the actuating member is moved to set and release the shutter in proper sequence through a single movement of the actuating member.

11. In a folding camera, the combination with a camera body, a bed hinged to said camera body, a setting type shutter foldably mounted on said bed, a setting lever on said shutter, a trigger release on said shutter, of an actuating member slidably mounted in said camera body, and a linkage operably connecting said actuating member with the setting lever and the trigger when the shutter is brought to picture-taking position, said linkage including a lever pivoted to the camera bed and extending into the path of the shutter trigger, a second lever pivoted to the camera bed and extending into the path of the setting lever, and suitable means actuated by the actuating member and connecting the actuating member and the two levers whereby the levers are rotated about their pivots to set and release the shutter in proper sequence when the actuating member is moved.

12. In a folding camera, the combination with a camera body, a bed hinged to said camera body and rotatably mounted thereto to swing between an open picture-taking position and a closed position, a shutter of the setting type foldably mounted on said bed, a setting lever on said shutter, a trigger release on said shutter, of an actuating member slidably mounted in said camera body, and a suitable linkage operably connecting said actuating member with the shutter trigger and setting lever to actuate the two in proper sequence when the camera parts are brought to their picture-taking positions, said linkage including a lever pivoted at one end to the camera bed and having its other end extending into the path of the shutter trigger, a slide mounted on the camera bed, a pin and slot connection between the slide and the lever whereby the latter is rotated upon movement of the slide, an arm connecting the actuating member with the slide whereby a movement of said actuating member is transmitted to the slide, a double ended lever pivoted to the camera bed whereby one end extends into the path of the setting lever while the other end extends toward the rear of the camera bed, and a finger fixed to and movable with the actuating member, said finger being adapted to extend forwardly over the camera bed to engage the end of the double ended lever extending toward the rear of the camera bed at the edge thereof whereby a rotation of the lever is effected upon movement of the actuating member.

AUGUST NAGEL.